(12) United States Patent
Register

(10) Patent No.: US 7,668,427 B2
(45) Date of Patent: Feb. 23, 2010

(54) FIBER OPTIC CABLES AND ASSEMBLIES AND THE PERFORMANCE THEREOF

(75) Inventor: James A. Register, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/156,162

(22) Filed: May 30, 2008

(65) Prior Publication Data

US 2008/0273846 A1 Nov. 6, 2008

Related U.S. Application Data

(62) Division of application No. 11/638,627, filed on Dec. 13, 2006, now Pat. No. 7,397,991.

(51) Int. Cl.
*G02B 6/44* (2006.01)

(52) U.S. Cl. .................. 385/102; 385/103; 385/104

(58) Field of Classification Search .................. 385/102, 385/103, 104
See application file for complete search history.

(56) References Cited

U.S. PATENT DOCUMENTS

| | | | | |
|---|---|---|---|---|
| 4,836,642 A * | 6/1989 | Matsumoto et al. | .......... | 385/145 |
| 4,946,902 A * | 8/1990 | Bekiarian et al. | ......... | 525/326.2 |
| 5,076,659 A * | 12/1991 | Bekiarian et al. | ........... | 385/143 |
| 5,260,957 A | 11/1993 | Hakimi et al. | ................ | 372/39 |
| 5,558,669 A * | 9/1996 | Reynard | ...................... | 606/15 |
| 5,561,729 A * | 10/1996 | Parris | ........................ | 385/113 |
| 5,591,160 A * | 1/1997 | Reynard | ...................... | 606/15 |
| 5,881,200 A | 3/1999 | Burt | .............................. | 385/142 |
| 6,494,496 B1 * | 12/2002 | Sweeney | .................... | 285/115 |
| 6,577,801 B2 | 6/2003 | Broderick et al. | ........... | 385/125 |
| 6,710,366 B1 | 3/2004 | Lee et al. | ...................... | 257/14 |
| 6,771,865 B2 * | 8/2004 | Blaszyk et al. | .............. | 385/127 |
| 6,801,699 B1 * | 10/2004 | Bickham et al. | ............ | 385/123 |
| 6,819,850 B2 * | 11/2004 | Sillard et al. | ................ | 385/127 |
| 6,839,484 B2 * | 1/2005 | White | ......................... | 385/29 |

(Continued)

FOREIGN PATENT DOCUMENTS

EP 0867740 A1 9/1998

(Continued)

OTHER PUBLICATIONS (Draka Comteq / Optical Fibre, "BendBrightxs Single Mode Optical Fibre", product information sheet, Issue date: Aug. 2006).*

(Continued)

*Primary Examiner*—K. Cyrus Kianni
(74) *Attorney, Agent, or Firm*—C. Keith Montgomery

(57) ABSTRACT

A fiber optic cable having at least one optical fiber such as a microstructured bend performance optical fiber disposed within a protective covering. The protective covering is highly flexible and the fiber optic cable has extremely low delta attenuation when aggressively bent compared with the conventional fiber optic cable designs. By way of example, the delta attenuation of one fiber optic cable design is about 0.33 dB or less when wrapped 3 turns about a 7.5 millimeter mandrel at a reference wavelength of 1625 nanometers. Other variations of the present invention include a connector attached to the fiber optic cable.

24 Claims, 5 Drawing Sheets

U.S. PATENT DOCUMENTS

| | | | |
|---|---|---|---|
| 6,952,519 B2 * | 10/2005 | Bickham et al. | 385/127 |
| 6,968,107 B2 | 11/2005 | Belardi et al. | 385/127 |
| 7,043,125 B2 * | 5/2006 | Diep et al. | 385/123 |
| 7,054,513 B2 | 5/2006 | Herz et al. | 385/12 |
| 7,082,243 B2 * | 7/2006 | Bickham et al. | 385/127 |
| 7,391,954 B1 * | 6/2008 | Castonguay et al. | 385/140 |
| 7,397,991 B1 * | 7/2008 | Register | 385/102 |
| 2003/0026566 A1 * | 2/2003 | Diep et al. | 385/123 |
| 2003/0103749 A1 * | 6/2003 | Kumar et al. | 385/127 |
| 2004/0033039 A1 * | 2/2004 | Oliveti et al. | 385/123 |
| 2004/0253057 A1 * | 12/2004 | Tsuchiya et al. | 405/183.5 |
| 2005/0013566 A1 * | 1/2005 | Storaasli et al. | 385/113 |
| 2006/0039664 A1 * | 2/2006 | Bickham | 385/127 |
| 2006/0108790 A1 * | 5/2006 | Powell et al. | 285/45 |
| 2006/0133753 A1 * | 6/2006 | Nelson et al. | 385/125 |
| 2006/0257086 A1 | 11/2006 | Ohsono et al. | 385/123 |
| 2008/0138022 A1 * | 6/2008 | Tassone | 385/124 |
| 2008/0145011 A1 * | 6/2008 | Register | 385/128 |

FOREIGN PATENT DOCUMENTS

| | | |
|---|---|---|
| EP | 1437612 | 7/2004 |
| EP | 1617243 A1 | 1/2006 |

OTHER PUBLICATIONS

Draka Comteq / Optical Fibre, "BendBright$^{XS}$ Single Mode Optical Fibre", product information sheet, Issue date: Aug. 2006.

Huntsman "IROGRAN A 78 P 4766", product information sheet, Update: Jul. 2001.

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-4/01, 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol. 4578, pp. 271-282; 2001.

The Lubrizol Corporation, Estane Thermoplastic Polyurethanes, Estane 58881 TPU Technical Data Sheet, Jul. 2006, 3 pgs.

Pickrell, et al., "Random Hole Optical Fibers," Proceedings of the SPIE, SPIE, Bellingham, VA, US, vol. 5272, XP002320309, Oct. 28, 2003, pp. 207-215.

Ellis, et al., "Microstructural Analysis of Random Hole Optical Fibers," IEEE Photonics Technology Letters, IEEE Service Center, Piscataway, NJ, US, vol. 16, No. 2, XP011107303, Feb. 2004, pp. 491-493.

Patent Cooperation Treaty, International Search Report for International Application No. PCT/US2007/025308, May 20, 2008, 2 pages.

* cited by examiner

FIBER OPTIC CABLES AND ASSEMBLIES AND THE PERFORMANCE THEREOF

CROSS-REFERENCE TO RELATED APPLICATIONS

The present application is a Divisional application of U.S. Ser. No. 11/638,627 filed on Dec. 13, 2006 now U.S. Pat. No. 7,397,991, the disclosure of which is incorporated herein by reference. The present application also incorporates by reference the disclosure of U.S. Ser. No. 11/638,606 entitled "HIGH DENSITY FIBER OPTIC HARDWARE", filed on Dec. 13, 2006 and assigned to Corning Cable Systems LLC.

FIELD OF THE INVENTION

The present invention relates generally to fiber optic cables and jumper assemblies and the performance thereof. By way of example, the invention is related to assemblies such as optical fiber jumpers having at least one bend performance optical fiber, thereby enabling previously unattainable optical performance characteristics.

BACKGROUND OF THE INVENTION

Along with the increase in the deployment of "Fiber-to-the-Premises" (FTTP) optical networks, a need has arisen for increasing the performance, manageability, handleability and flexibility of fiber optic cables, cable assemblies and network components in general. With respect to outdoor installation environments, cables, cable assemblies and other network components are being developed that are more easily interconnected and installed within their environment, such as within aerial installation environments or through small diameter conduit. With respect to indoor environments and multi-dwelling units, cables, cable assemblies, connection terminals and other network components are being developed to improve installation aesthetics and handle the interconnection of an increasing number of subscribers. Within both environments, it would be desirable to develop components that perform better, are more flexible to installation stresses and are more robust and long lasting, thus saving time and costs.

Conventional cables, cable assemblies, fiber optic hardware and other network components typically define structure that accommodates, and is in part, limited by the physical characteristics of the optical fibers contained therein. In other words, it is oftentimes the case that the physical and performance limitations of the optical fibers partly define assembly structure and processes associated with manufacturing said assemblies. Thus, optical fibers are one limiting factor in the evolution of fiber optic networks.

Accordingly, what is desired are fiber optic cables and jumper assemblies that include bend performance optical fiber having improved bending performance characteristics over conventional cables and assemblies. It would be desirable to provide cables and jumper assemblies capable of being significantly bent or wrapped, either stand-alone or around network structure, without suffering appreciable loss. Such cables and assemblies including bend performance fiber would be more accepting of handling without damage.

BRIEF SUMMARY OF THE INVENTION

To achieve the foregoing and other objects, and in accordance with the purposes of the invention as embodied and broadly described herein, the present invention provides various embodiments of fiber optic cables, jumpers and other assemblies including bend performance optical fiber in at least a portion thereof. The present invention further provides bend performance optical fiber suitable for use in fiber optic cables, fiber optic hardware and other assemblies, wherein the bend performance optical fiber comprises certain physical and performance characteristics that lends itself to reduced component size, tighter bend radius tolerances without degraded performance, and relaxes fiber routing and handling requirements.

In one embodiment, the bend performance optical fiber of the present invention is a microstructured optical fiber comprising a core region and a cladding region surrounding the core region, the cladding region comprising an annular hole-containing region comprised of non-periodically disposed holes or voids, such that the optical fiber is capable of single mode transmission at one or more wavelengths in one or more operating wavelength ranges. The non-periodically disposed holes are randomly or non-periodically distributed across a portion of the fiber. The holes may be stretched (elongated) along the length (i.e. in a direction generally parallel to the longitudinal axis) of the optical fiber, but may not extend the entire length of the entire fiber for typical lengths of transmission fiber.

In other embodiments, the bend performance fiber of the present invention may comprise at least a portion of fiber optic cables, fiber optic cable assemblies, network connection terminals, fiber optic hardware or any other fiber optic network component including at least one optical fiber maintained therein, routed therein or routed therethrough.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the embodiments set forth herein. These exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
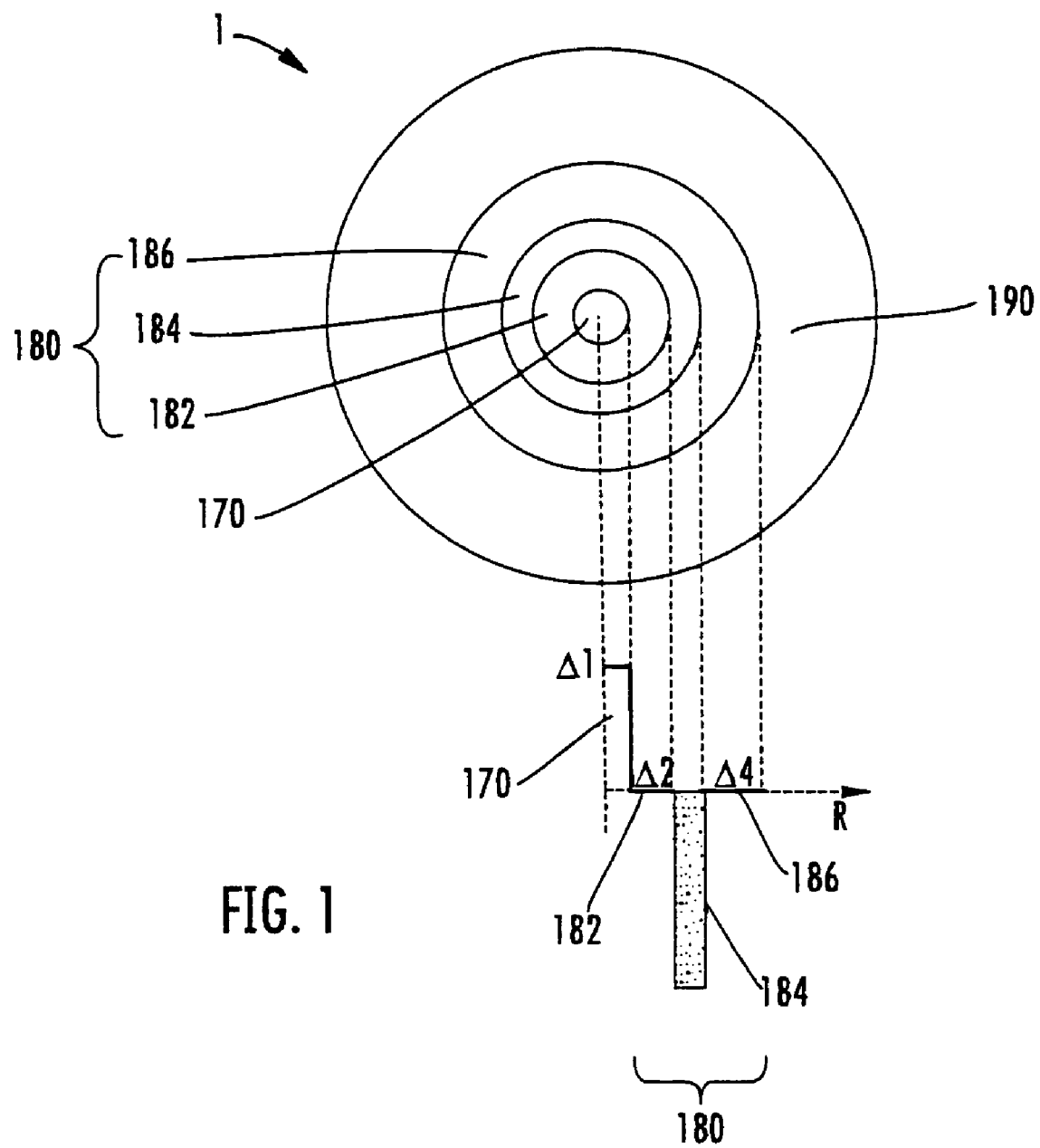
FIG. 1 is a schematic diagram illustrating a cross-section of a bend performance optical fiber operable in accordance with an exemplary embodiment of the present invention.

FIG. 1 depicts a representation of a bend performance optical fiber 1 suitable for use in fiber optic cables, cables assemblies, fiber optic hardware and other network components of the present invention. The present invention is advantageous because it permits assemblies having aggressive bending/installation solutions while optical attenuation remains extremely low. As shown, bend performance optical fiber 1 is a microstructured optical fiber having a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 microns, more preferably between about 8.0 and 10.0 microns. In preferred embodiments, optical fiber disclosed herein is thus single-mode transmission optical fiber.

In some embodiments, the microstructured optical fibers disclosed herein comprises a core region disposed about a longitudinal centerline, and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution", we mean that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fibers disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

In one set of embodiments, the core region includes doped silica to provide a positive refractive index relative to pure silica, e.g. germania doped silica. The core region is preferably hole-free. As illustrated in FIG. 1, in some embodiments, the core region 170 comprises a single core segment having a positive maximum refractive index relative to pure silica $\Delta_1$ in %, and the single core segment extends from the centerline to a radius $R_1$. In one set of embodiments, $0.30\% < \Delta_1 < 0.40\%$, and $3.0 \mu m < R_1 < 5.0 \mu m$. In some embodiments, the single core segment has a refractive index profile with an alpha shape, where alpha is 6 or more, and in some embodiments alpha is 8 or more. In some embodiments, the inner annular hole-free region 182 extends from the core region to a radius $R_2$, wherein the inner annular hole-free region has a radial width W12, equal to R2-R1, and W12 is greater than 1 μm. Radius R2 is preferably greater than 5 μm, more preferably greater than 6 μm. The intermediate annular hole-containing region 184 extends radially outward from R2 to radius R3 and has a radial width W23, equal to R3-R2. The outer annular region 186 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region 170 and the cladding region 180 are preferably comprised of silica. The core region 170 is preferably silica doped with one or more dopants. Preferably, the core region 170 is hole-free. The hole-containing region 184 has an inner radius R2 which is not more than 20 μm. In some embodiments, R2 is not less than 10 μm and not greater than 20 μm. In other embodiments, R2 is not less than 10 μm and not greater than 18 μm. In other embodiments, R2 is not less than 10 μm and not greater than 14 μm. Again, while not being limited to any particular width, the hole-containing region 184 has a radial width W23 which is not less than 0.5 μm. In some embodiments, W23 is not less than 0.5 μm and not greater than 20 μm. In other embodiments, W23 is not less than 2 μm and not greater than 12 μm. In other embodiments, W23 is not less than 2 μm and not greater than 10 μm.

Such fiber can be made to exhibit a fiber cutoff of less than 1400 nm, more preferably less than 1310 nm, a 20 nm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12 mm macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn, and a 8 mm macrobend induced loss at 1550 nm of less than 5 dB/turn, preferably less than 1 dB/turn, more preferably less than 0.5 dB/turn, and even more preferably less than 0.2 dB-turn, and still even more preferably less than 0.1 dB/turn.

Figure 2:
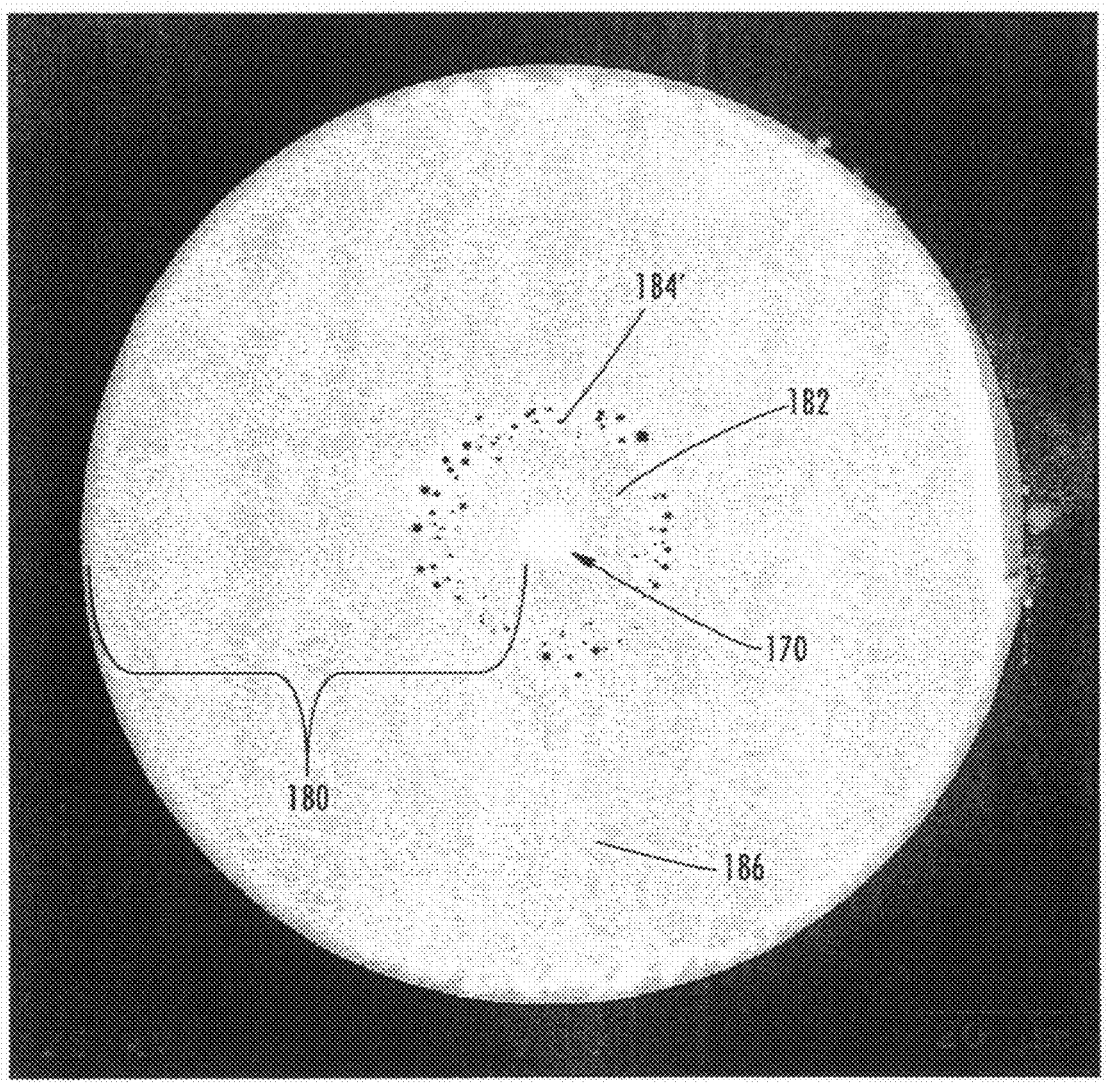
FIG. 2 is a cross-sectional image of a microstructured bend performance optical fiber illustrating an annular hole-containing region comprised of non-periodically disposed holes.

An example of a suitable fiber is illustrated in FIG. 2. The fiber in FIG. 2 comprises a core region that is surrounded by a cladding region that comprises randomly disposed voids which are contained within an annular region spaced from the core and positioned to be effective to guide light along the core region. Other optical fibers and microstructured fibers may be used in the present invention. Additional description of microstructured fibers used in the present invention are disclosed in pending U.S. patent application Ser. No. 11/583,098 filed Oct. 18, 2006; and, Provisional U.S. patent application Ser. Nos. 60/817,863 filed Jun. 30, 2006; 60/817,721 filed Jun. 30, 2006; 60/841,458 filed Aug. 31, 2006; and 60/841,490 filed Aug. 31, 2006; all of which are assigned to Corning Incorporated; and incorporated herein by reference.

Figure 2A:
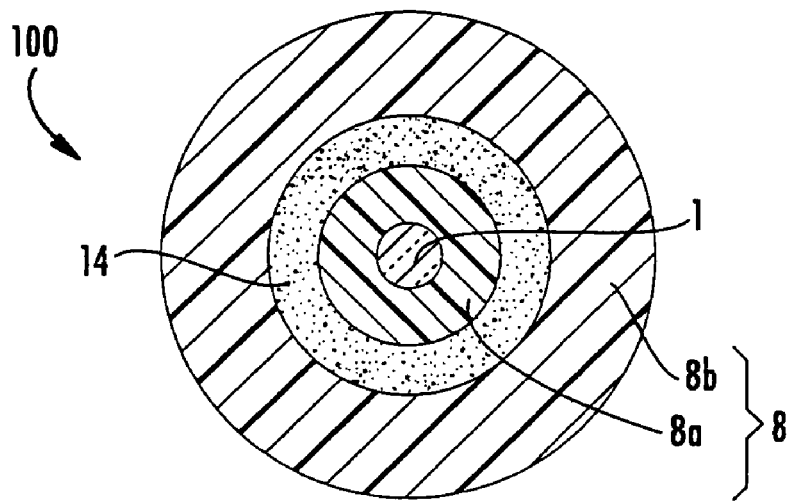
FIG. 2a is a cross-sectional image of a fiber optic cable using the microstructured bend performance optical fiber of FIG. 1 according to the present invention.
Figure 2B:
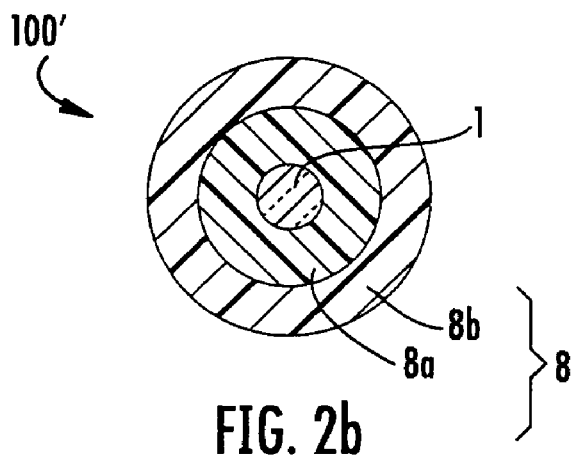
FIG. 2b is a cross-sectional image of another fiber optic cable using the microstructured bend performance optical fiber of FIG. 1 according to the present invention.

Optical fiber cables of the present invention allow aggressive bending such as for installation, slack storage, and the like while inhibiting a bend radii that allows damage and/or breaks the optical fiber. FIG. 2a shows a cross-sectional view of explanatory fiber optic cable 100 having optical fiber 1 within a protective covering 8. Generally speaking, optical fiber 1 is maintained within at least one protective covering such as a buffer layer and/or a jacket and is referred to herein as a "fiber optic cable". As shown, protective covering 8 includes a buffer layer 8a disposed about optical fiber 1 and a jacket 8b. Additionally, fiber optic cable 100 also includes a plurality of optional strength members 14 disposed between buffer layer 8a and jacket 8b. Strength members 14 can also include a water-swellable component for blocking the migration of water along the fiber optic cable. FIG. 2b depicts an alternate fiber optic cable 100' that is similar to fiber optic cable 100, but it does not include strength members and consequently has a smaller outer diameter such as about 4 millimeters if the jacket wall thickness remains the same. Additionally, since the strength members are omitted it is possible to remove the buffer layer and jacket from the fiber optic cable in a single step. Other fiber optic cables and/or other assembly designs are also possible according to the concepts of the invention. By way of example, variations of fiber optic cables 100 and 100' can be preconnectorized with a connector for plug and play connectivity. For instance, fiber optic cables can include a hardened plug and connector such as an Opti-Tap or Opti-Tip available from Corning Cable Systems of Hickory, N.C.

Protective covering 8 uses a bend radius control mechanism for protecting the optical fiber by inhibiting damage and/or breaking of the optical fiber as the fiber optic cable is bent into small bend radii while still providing a highly flexible fiber optic cable design. In other words, the bend radius control mechanism maintains a minimum bend radii for the optical fiber so damage and/or breaking is avoided. By way of example, fiber optic cable 100 can be tied in a knot, bent about small structures, and the like while having extremely low optical attenuation; however, the fiber optic cable still should prevent damage and/or breaking of the optical fiber during these installations. Previously, conventional fiber optic cables would have high optical attenuation or go dark before breaking the optical fiber was a concern, thus the craft avoided using small bend radii for preserving optical performance. One benefit of the present invention is that the fiber optic cable designs are suitable for rugged installations both by the craft and untrained individuals.

Robustness of the fiber optic cable design is accomplished by suitable coupling with the protective covering for inhibiting buckling of the optical fiber within the same. Additionally, maintaining coupling between jacket 8b and strength members 14 inhibits the transfer of tensile forces to optical fiber 1. Coupling is accomplished using a pressure extrusion process and can allow aggressive bending of the fiber optic cable while maintaining a suitable coupling level. Consequently, the coupling results in very little to no construction stretch for the strength members. As used herein, construction stretch means that all of the cable components are not simultaneously stretched when applying a tensile force to the fiber optic cable. Illustratively, a fiber optic cable exhibiting construction stretch typically has the jacket and optical fiber supporting the initially applied tensile force, but the strength members do not. Thus, as the jacket and optical fiber are stretched to a point where the slack in the strength members is removed and the strength members also begin to support the load. This construction stretch is problematic since it initially allows the optical fiber to strain, which limits the ultimate tensile strength of the fiber optic cable. Additionally, after the tensile force is removed from the fiber optic cable the jacket stretched before the optical fiber, thereby allowing buckling and/or compression of the optical fiber within the fiber optic cable that can cause optical losses. Any suitable type of material may be used for protective covering 8 such as polyurethanes (PU), polyvinylchloride (PVC), polyethylenes (PE), polyproplyenes (PP), UV curable materials, etc. depending on the desired construction and characteristics. Additionally, protective coverings 8 can use flame-retardant materials such as a flame-retardant PVC or the like as known in the art. Desirably, fiber optic cables of the invention uses highly-flexible and robust designs that allow aggressive bending of the cable while maintaining a minimum bend radii.

Figure 2C:
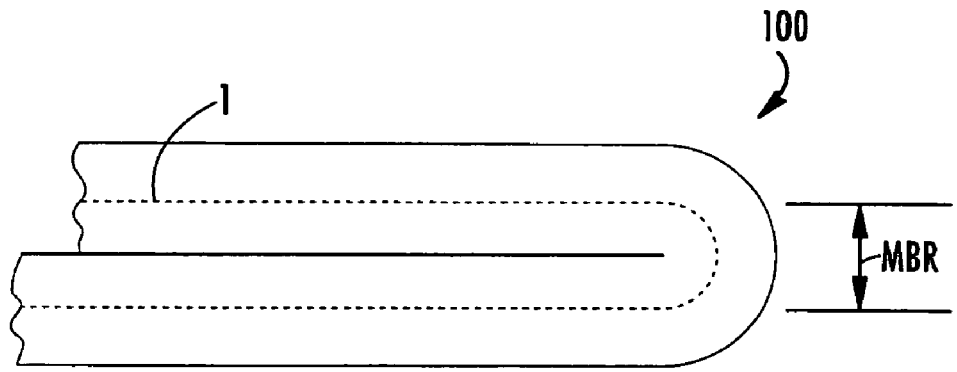
FIG. 2c is a plan view of the fiber optic cable of FIG. 2a being bent in an aggressive manner to demonstrate a minimum bend radius.

More specifically, fiber optic cable 100 is designed so that it is highly flexible, maintains a minimum bend radius to inhibit breaking of the optical fiber when aggressively bent, and have enough coupling between protective covering 8 and optical fiber 1 to inhibit buckling of the optical fiber within protective covering 8. By way of example, fiber optic cable 100 includes optical fiber 1 having a plenum-grade buffer layer 8a with an outer diameter of about 900 microns. Other types of materials, sizes, shapes, etc are also possible for the buffer layer. Thereafter, four strength members 14 were run in a parallel configuration (i.e., no stranding) about the buffered optical fiber before jacket 8b was applied. Eliminating stranding of strength members 14 is also advantageous since it allows for increased line speeds. Jacket 8b was pressure extruded using a PU material available from Huntsman available under the tradename Irogran A78 P 4766. The jacket material used had a relatively high ultimate elongation (i.e., elongation before breaking) measured according to DIN 53504 (a German measurement standard), thereby providing a highly flexible fiber optic cable design. Jackets for fiber optic cables of the invention have an ultimate elongation that is about 500% or greater such as about 600% or greater, and even about 700% or greater. The PU jacket material used had an ultimate elongation of about 800% along with a 300% tensile modulus of about 8.0 MPa. Additionally, jacket 8b had an outer diameter of about 5 millimeters with an inner diameter of about 1.7 millimeters. Consequently, fiber optic cable 100 had an excellent flexibility while still inhibiting breaking of the optical fiber when aggressively bent for instance when fiber optic cable is bent like a hairpin as shown in FIG. 2c the bend radius control mechanism MBR is provided by jacket 8b along with its coupling characteristics. In other words, the bend radius control mechanism MBR of jacket 8b provides a minimum bend diameter of about 5 millimeters (e.g., about two times the radius of the fiber optic cable) for inhibiting breaking of the optical fiber when bent as shown in FIG. 2c. Using the bend radius control mechanism also improves crush performance of the fiber optic cable since the jacket is relatively thick and highly flexible. Furthermore, the optical performance of fiber optic cable 100 during aggressive bending is impressive compared with conventional fiber optic cables.

To test the optical performance of fiber optic cable 100, a corner bend test was conducted as described below. The corner bend test routed a portion of fiber optic cable 100 over a 90 degree edge (i.e., nearly a zero bend radius) and weights were hung from the fiber optic cable to apply a constant force at the bend while measuring a delta attenuation (e.g., change in attenuation) at a reference wavelength of 1625 nanometers due to the applied force. The corner bend test used fiber optic cable 100 and a similar fiber optic cable design using a SMF28-e optical fiber available from Corning, Inc. The results for the corner bend test are summarized in Table 1 below.

TABLE 1

Corner Bend Test

| | Conventional Cable Delta Attenuation (dB) | | | Fiber Optic Cable 100 Delta Attenuation (dB) | | |
|---|---|---|---|---|---|---|
| Load (kg) | 1310 nm | 1550 nm | 1625 nm | 1310 nm | 1550 nm | 1625 nm |
| 0 | 0.00 | 0.00 | 0.00 | 0.00 | 0.01 | 0.02 |
| 0.6 | 1.16 | 3.16 | 5.21 | 0.01 | 0.02 | 0.04 |
| 1 | 2.51 | 8.14 | 11.06 | 0.01 | 0.06 | 0.09 |
| 5 | — | — | — | 0.03 | 0.18 | 0.22 |
| 10 | — | — | — | 0.03 | 0.15 | 0.22 |

As depicted in Table 1, the conventional cable had elevated levels of delta attenuation at all wavelengths with a load of 0.6 kilograms. Moreover, the delta attenuation was so high above a load of 1 kilogram that measurements were not taken. On the other hand, fiber optic cable 100 had low delta attenuation values with loads up to 10 kilograms. By way of example, fiber optic cable 100 had a delta attenuation of about 0.1 dB or less for the corner bend test with a load of 1 kilogram at a reference wavelength of 1625 nanometers. Other testing was also performed such as bending fiber optic cable 100 about a mandrel with a given diameter along with a conventional fiber optic cable for comparison purposes. More specifically, a delta attenuation (dB) for the loss was measured after wrapping a predetermined number of turns (i.e., each turn is about 360 degrees) of fiber optic cable around a mandrel with a given diameter.

TABLE 2

Mandrel Wrap Test at a Reference Wavelength of 1625 nanometers

| | Conventional Cable Delta Attenuation (dB) | | | Fiber Optic Cable 100 Delta Attenuation (dB) | | |
|---|---|---|---|---|---|---|
| Number of Turns | 4.6 mm mandrel | 7.5 mm mandrel | 15 mm mandrel | 4.6 mm mandrel | 7.5 mm mandrel | 15 mm mandrel |
| 0 | — | — | 0.00 | 0.00 | 0.00 | 0.00 |
| 1 | — | — | 3.10 | 0.39 | 0.10 | 0.07 |
| 2 | — | — | 7.96 | 0.56 | 0.18 | 0.11 |
| 3 | — | — | 11.58 | 0.83 | 0.33 | 0.17 |
| 4 | — | — | 16.03 | 1.18 | 0.53 | 0.23 |
| 5 | — | — | 20.19 | 1.43 | 0.68 | 0.23 |

As depicted in Table 2, the conventional cable had elevated levels of delta attenuation when it was wrapped about a 15 millimeter mandrel. Moreover, the delta attenuation was so large with mandrels smaller than 15 millimeters that the measurements were not taken. On the other hand, fiber optic cable 100 had delta attenuation values that were more than an order of magnitude lower using a 15 millimeter mandrel. By way of example, fiber optic cable 100 had a delta attenuation of about 0.33 dB or less when wrapped 3 turns about a 7.5 millimeter mandrel at a reference wavelength of 1625 nanometers.

Figure 3:
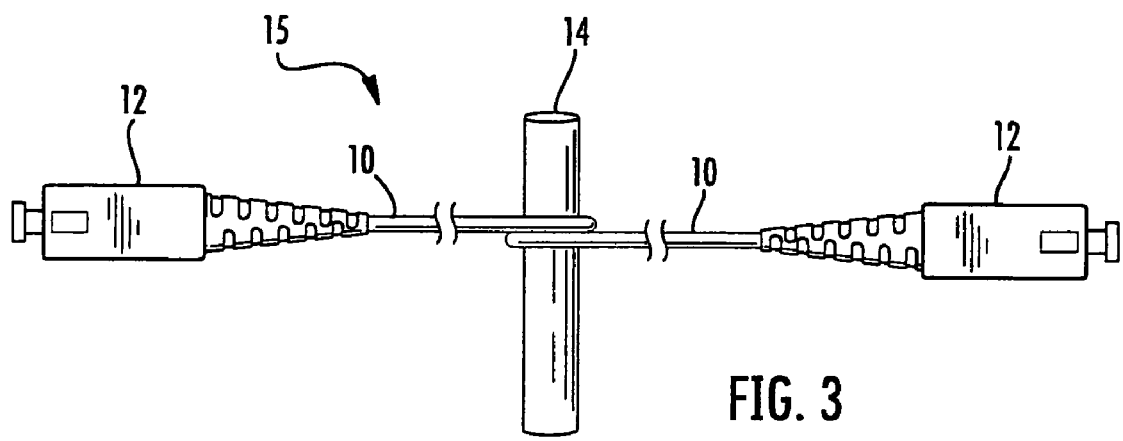
FIG. 3 illustrates one embodiment of an optical fiber jumper assembly using microstructured bend performance optical fiber of FIG. 1 completing about one turn about a small diameter structure.
Figure 4:
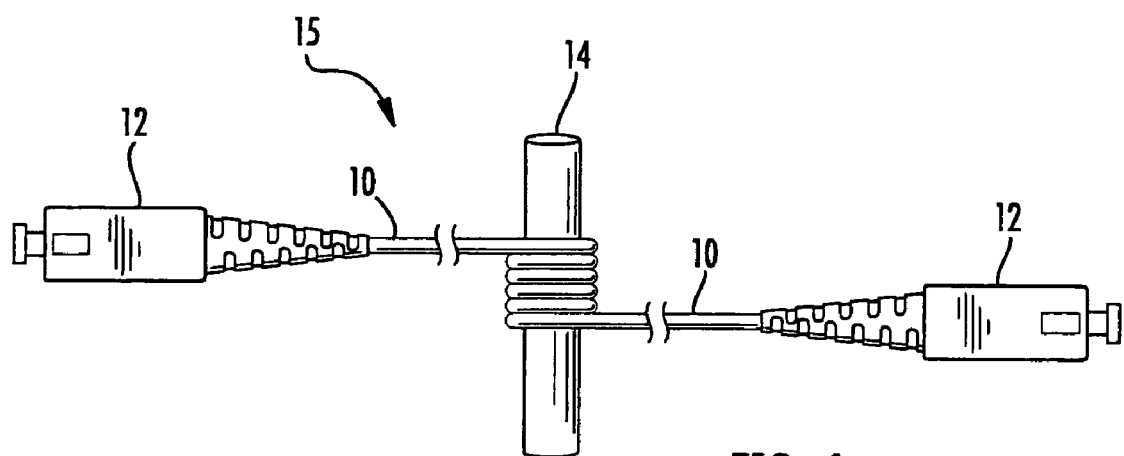
FIG. 4 illustrates the optical fiber jumper assembly of FIG. 3 completing multiple turns about a structure.
Figure 5:
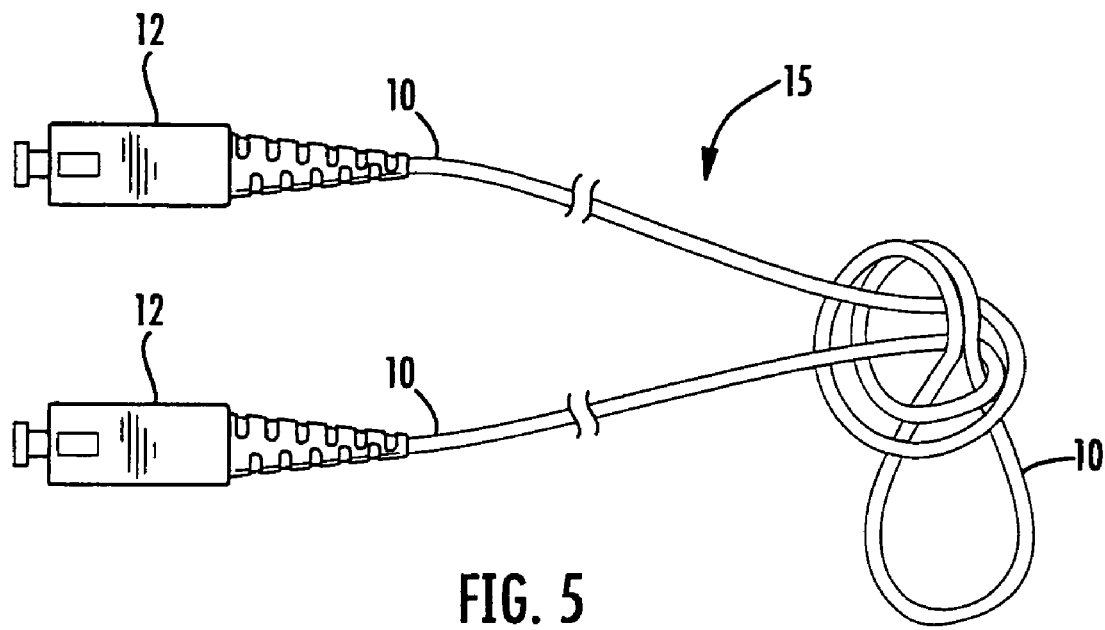
FIG. 5 illustrates the optical fiber jumper assembly of FIG. 3 shown tied in a knot.

Another example of assemblies useful with the concepts of the present invention are optical fiber jumper assemblies that are, generally speaking, used within structures for interconnection purposes. FIGS. 3-5 depict an explanatory optical fiber jumper assembly 15 (hereinafter "jumper assembly") using optical fiber 1 and is shown in various configurations to illustrate physical and performance capabilities of assemblies according to the concepts of the invention. Moreover, jumper assemblies represented by jumper assembly 15 were tested for optical performance and compared with conventional jumper assemblies as presented below. Jumper assemblies of the invention preserve optical attenuation during, for example, macrobending down to levels not previously attainable with previous constructions.

As shown, jumper assembly 15 is connectorized at each end using SC connectors 12, such as those available from Corning Cable Systems of Hickory, N.C., using techniques known in the art. Of course, jumper assemblies may include any length of fiber optic cable, type of connector and/or number of optical fibers capable of performing interconnections within an optical network. It is envisioned that a jumper assembly may be connectorized at each end using similar or, dissimilar connector types such as LC, FC, MT, MTP, among others. The jumper assembly 15 may be aggressively bent, either stand-alone or about network structure, such as for installation, slack storage and routing without suffering appreciable attenuation and without damage and/or breaks to the optical fiber. The at least one optical fiber 1 is within a protective covering 10 such as, but not limited to, a coating, a buffer, or a jacket. In one example, the fiber 1 may be upjacketed to about 500 um or about 900 um. The jumper assembly may further include strength members, such as aramid strength members, as is commonly known in the art. Other fiber optic jumper assemblies are also possible according to the concepts of the invention.

The protective covering 10 may be made from material including bend radius control properties for protecting the at least one optical fiber within by inhibiting damage and/or breaking of the optical fiber as the jumper assembly is bent into small bend radii while still providing a highly flexible jumper design. By way of example, the jumper assembly 15 can be tied in a knot, bent about small structures, and the like while having extremely low optical attenuation.

Referring specifically to FIG. 3, jumper assembly 15 is shown completing one turn or wrap about a mandrel 14. Mandrel 14 is shown to provide a guide for bending jumper assembly 15 about a structure, and generically mandrel 14 represents a portion of network structure about which the jumper assembly is installed (e.g., a network interface device (NID), a cabinet, routing guide, connector housing, connector port or the like). Mandrel 14 defines a diameter, for example, the diameter is about 10 millimeters or about 6 millimeters, but other sizes are possible. Referring specifically to FIG. 4, jumper assembly 15 is shown wrapped about the mandrel 14 and completing about five turns. Referring specifically to FIG. 5, jumper assembly 15 is shown tied in a knot.

Table 3 details optical performance data for different fiber optic cable designs at a reference wavelength of 1625 nanometers. More specifically, a delta attenuation (dB) for the loss was measured after wrapping a predetermined number of turns (i.e., each turn is about 360 degrees) of fiber optic cable around a mandrel with a given diameter. Table 3 depicts the results for two different single fiber cable (SFC) designs (i.e., a 2.0 millimeter SFC and a 2.9 millimeter SFC) that were used as a portion of the tested jumper assemblies. Each of the SFC designs used a conventional optical fiber and a microstructured bend performance optical fiber, thereby resulting in four jumper assemblies for testing. Additionally, two different microstructured bend performance optical fibers were used in the jumper assemblies of the present invention to compare performance, listed in the table below as Type I and Type II bend performance fibers. The conventional optical fiber used in the conventional jumper assemblies was a SMF-28e optical fiber available from Corning Incorporated of Corning, N.Y. Both the 2.0 millimeter and the 2.9 SFC designs included an optical fiber having a 900 micron buffer layer thereon that was surrounded by a plurality of aramid strength members and a jacket. The differences between the 2.0 millimeter and 2.9 millimeter SFC include the jacket wall thickness (e.g., respectively about 0.33 millimeters and about 0.45 millimeters) and the quantity of aramid used.

TABLE 3

Delta Attenuation (dB) at 1625 nanometers after Wrapping Around a Mandrel

| Mandrel Diameter-# of Turns | Delta Attenuation Conventional 2.0 mm SFC | Delta Attenuation Conventional 2.9 mm SFC | Delta Attenuation 2.0 mm SFC Type I | Delta Attenuation 2.9 mm SFC Type II |
|---|---|---|---|---|
| 10 mm-1 Turns | 25.42 dB | 27.20 dB | 0.11 dB | 0.00 dB |
| 10 mm-2 Turns | 41.30 dB | 42.30 dB | 0.27 dB | 0.00 dB |
| 10 mm-3 Turns | 45.00 dB | 45.00 dB | 0.42 dB | 0.00 dB |
| 10 mm-4 Turns | 45.89 dB | 45.80 dB | 0.70 dB | 0.00 dB |
| 10 mm-5 Turns | 46.20 dB | 46.20 dB | 0.93 dB | 0.00 dB |
| 6 mm-1 Turns | 46.20 dB | 46.00 dB | 0.46 dB | 0.00 dB |
| 6 mm-2 Turns | 46.20 dB | 46.00 dB | 0.98 dB | 0.00 dB |
| 6 mm-3 Turns | 46.20 dB | 46.00 dB | 1.70 dB | 0.00 dB |
| 6 mm-4 Turns | 46.20 dB | 46.00 dB | 2.72 dB | 0.00 dB |
| 6 mm-5 Turns | 46.20 dB | 46.00 dB | 3.12 dB | 0.00 dB |
| 90 degree bend | 0.86 dB | 0.53 dB | 0.03 dB | 0.00 dB |

As depicted in Table 3, the conventional SFC jumpers had elevated levels of delta attenuation at all turns about both mandrel diameters. In comparison, the jumper assemblies including both Type I and II fiber had delta attenuation orders of magnitude lower, and with respect to the jumper assembly including Type II bend performance fiber, there was no delta attenuation at all turns about each mandrel diameter. Further, both the conventional and Type I and II jumper assemblies were bent about a 90 degree bend, such as a corner bend test, and the jumper assemblies including bend performance fiber outperformed the conventional jumpers. By way of example, the jumper assembly 15 including bend performance fiber had a delta attenuation of about 0.03 dB or less for the 90 degree bend test at a reference wavelength of 1625 nanometers.

Figure 6:
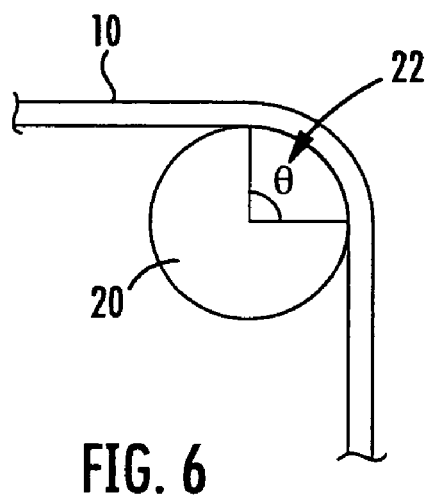
FIG. 6 illustrates a portion of an optical fiber jumper assembly including bend performance fiber bent about 90 degrees around generic network structure.
Figure 7:
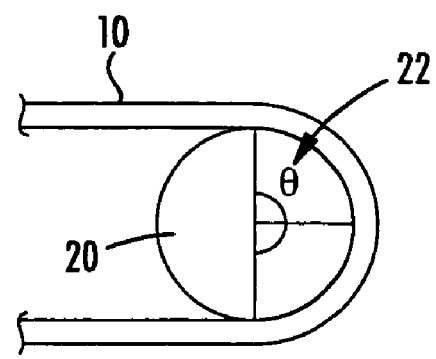
FIG. 7 illustrates a portion of an optical fiber jumper assembly including bend performance fiber bent about 180 degrees around generic network structure.

Bend performance fibers of the present invention may be included within various cable types and cable assemblies to achieve highly flexible cables to facilitate installation and require less skill in handling. The cables and cable assemblies described herein maybe installed within fiber optic hardware such as local convergence points for multi-dwelling units, cross-connect frames and modules, and surface, pad and pole mounted local convergence points showing smaller size and higher density. Referring to FIGS. 6-7, a portion of the jumper assembly with the protective covering 10 is shown wrapped around generic network structure 20. An angle theta 22 corresponds to a portion of a turn about the generic structure 20. Generic structure 20 may include, but is not limited to, structure of fiber optic cable assemblies, hardware, spools, thru holes, connector ports, routing guides, cabinets or any other structure within the network.

The foregoing is a description of various embodiments of the invention that are given here by way of example only. Although fiber optic cables and jumper assemblies including bend performance fiber in at least a portion thereof have been described with reference to preferred embodiments and examples thereof, other embodiments and examples may perform similar functions and/or achieve similar results. All such equivalent embodiments and examples are within the spirit and scope of the present invention and are intended to be covered by the appended claims.

What is claimed is:

1. A fiber optic cable, comprising:
   at least one optical fiber, the at least one optical fiber being a microstructured bend performance optical fiber; and
   a protective covering, the protective covering being highly flexible and the fiber optic cable has a delta attenuation of about 0.33 dB or less when wrapped 3 turns about a 7.5 millimeter diameter mandrel at a reference wavelength of 1625 nanometers, wherein
   the fiber optic cable is flame retardant.

2. The fiber optic cable of claim 1, the fiber optic cable having a delta attenuation of about 0.1 dB or less for a corner bend test with a load of 1 kilogram and a reference wavelength of 1625 nanometers.

3. The fiber optic cable of claim 2, further comprising at least one strength member, wherein the protective covering is coupled about the at least one strength member for inhibiting buckling of the at least one optical fiber therein.

4. The fiber optic cable of claim 2, wherein the protective covering includes a buffer layer and a jacket.

5. The fiber optic cable of claim 2, wherein the fiber optic cable has a delta attenuation of about 0.22 dB or less for a corner bend test with a load of 10 kilogram at a reference wavelength of 1625 nanometers.

6. The fiber optic cable of claim 1, the at least one optical fiber having a buffer layer thereon.

7. The fiber optic cable of claim 1, wherein the protective covering includes a buffer layer and a jacket.

8. The fiber optic cable of claim 1, further including a connector attached to the fiber optic cable.

9. The fiber optic cable of claim 1, wherein the fiber optic cable has a delta attenuation of about 0.22 dB or less for a corner bend test with a load of 10 kilogram at a reference wavelength of 1625 nanometers.

10. The fiber optic cable of claim 1, further comprising at least one strength member, wherein the protective covering is coupled about the at least one strength member for inhibiting buckling of the at least one optical fiber therein.

11. A fiber optic cable, comprising:
    at least one optical fiber, the at least one optical fiber being a microstructured bend performance optical fiber; and
    a protective covering, the protective covering being highly flexible and the fiber optic cable has a delta attenuation of about 0.33 dB or less when wrapped 3 turns about a 7.5 millimeter diameter mandrel at a reference wavelength of 1625 nanometers,
    wherein the protective covering has an ultimate elongation of about 500% or more measured according to DIN 53504.

12. The fiber optic cable of claim 11, the fiber optic cable having a delta attenuation of about 0.1 dB or less for a corner bend test with a load of 1 kilogram and a reference wavelength of 1625 nanometers.

13. The fiber optic cable of claim 11, further comprising at least one strength member, wherein the protective covering is coupled about the at least one strength member for inhibiting buckling of the at least one optical fiber therein.

14. The fiber optic cable of claim 11, wherein the protective covering includes a buffer layer and a jacket.

15. The fiber optic cable of claim 11, wherein the fiber optic cable has a delta attenuation of about 0.22 dB or less for a corner bend test with a load of 10 kilogram at a reference wavelength of 1625 nanometers.

16. A fiber optic cable, comprising:
    at least one optical fiber, the at least one optical fiber being a microstructured bend performance optical fiber; and
    a protective covering, the protective covering being highly flexible and the fiber optic cable has a delta attenuation of about 0.33 dB or less when wrapped 3 turns about a 7.5 millimeter diameter mandrel at a reference wavelength of 1625 nanometers,
    the protective coating providing a bend control mechanism for inhibiting bending of the at least one optical fiber at a diameter of 5 millimeters or less.

17. The fiber optic cable of claim 16, further comprising at least one strength member, wherein the protective covering is coupled about the at least one strength member for inhibiting buckling of the at least one optical fiber therein.

18. The fiber optic cable of claim 16, wherein the protective covering includes a buffer layer and a jacket.

19. The fiber optic cable of claim 16, wherein the fiber optic cable has a delta attenuation of about 0.22 dB or less for a corner bend test with a load of 10 kilogram at a reference wavelength of 1625 nanometers.

20. A fiber optic cable, comprising:
    at least one optical fiber, the at least one optical fiber being a microstructured bend performance optical fiber;
    a protective covering, the protective covering being highly flexible and the fiber optic cable has a delta attenuation of about 0.33 dB or less when wrapped 3 turns about a 7.5 millimeter diameter mandrel at a reference wavelength of 1625 nanometers; and
    at least one strength member, wherein the protective covering is coupled about the at least one strength member for inhibiting buckling of the at least one optical fiber therein.

21. The fiber optic cable of claim 20, further comprising at least one strength member, wherein the protective covering is coupled about the at least one strength member for inhibiting buckling of the at least one optical fiber therein.

22. The fiber optic cable of claim 20, wherein the protective covering includes a buffer layer and a jacket.

23. The fiber optic cable of claim 20, wherein the fiber optic cable has a delta attenuation of about 0.22 dB or less for a corner bend test with a load of 10 kilogram at a reference wavelength of 1625 nanometers.

24. A fiber optic cable, comprising:
at least one optical fiber, the at least one optical fiber being a microstructured bend performance optical fiber; and
a protective covering, the protective covering being highly flexible and the fiber optic cable has a delta attenuation of about 0.33 dB or less when wrapped 3 turns about a 7.5 millimeter diameter mandrel at a reference wavelength of 1625 nanometers, wherein
the at least one microstructured optical fiber has a core region surrounded by a cladding region, the cladding region includes an annular hole-containing region having non-periodically disposed holes, the annular hole-containing region being spaced apart from the core region, and
wherein greater than about 95 percent of the holes in the at least one microstructured optical fiber have a mean hole size of 775 nanometers or less.

* * * * *